United States Patent [19]

Terramoto et al.

[11] 4,272,174

[45] Jun. 9, 1981

[54] AUTOMATIC AND MANUAL FOCUS CONTROL LENS BARREL STRUCTURE

[75] Inventors: Tougo Teramoto, Wakayama; Shuzo Matsushita, Ikeda; Toshio Kobori, Sakai, all of Japan

[73] Assignee: Minolta Camera Kabushiki Kaisha, Osaka, Japan

[21] Appl. No.: 97,236

[22] Filed: Nov. 26, 1979

Related U.S. Application Data

[63] Continuation of Ser. No. 96,731, Nov. 23, 1979, abandoned.

[30] Foreign Application Priority Data

Nov. 25, 1978 [JP] Japan ............................. 53-145502
Nov. 25, 1978 [JP] Japan ............................. 53-145503
Apr. 30, 1979 [JP] Japan ............................. 54-53663

[51] Int. Cl.$^3$ ............................. G03B 3/02; G03B 7/08
[52] U.S. Cl. ............................. 354/195; 354/25
[58] Field of Search ............................. 352/140; 350/46; 354/195, 25

[56] References Cited

U.S. PATENT DOCUMENTS

| | | | |
|---|---|---|---|
| 4,057,327 | 11/1977 | Kumazawa | 354/195 X |
| 4,110,769 | 8/1978 | Schütz et al. | 354/195 |
| 4,149,792 | 4/1979 | Fraser et al. | 354/25 X |
| 4,154,157 | 5/1979 | Tamura et al. | 354/25 |
| 4,191,460 | 3/1980 | Fujiki | 352/140 X |

*Primary Examiner*—Donald A. Griffin
*Attorney, Agent, or Firm*—Watson, Cole, Grindle & Watson

[57] ABSTRACT

In a lens barrel for automatic and manual focus control of a camera, a non-movable barrel is adapted to be mounted on the camera and a first movable barrel is movably carried by the non-movable barrel with a second movable barrel movably carried by the first movable barrel and a third movable barrel movably carried by the second movable barrel for carrying at least one lens group for focussing by means of axial movement of the lens group. The third movable barrel is guided for movement without rotation relative to the non-movable barrel and the second movable barrel is shifted along the optical axis of the lens group relative to the non-movable barrel. The third movable barrel is shifted along the optical axis relative to the non-movable barrel with either the shifting of the second movable barrel or the shifting of the third movable barrel being for automatic focus control operation and the other being for manual focus control operation.

13 Claims, 18 Drawing Figures

AUTOMATIC AND MANUAL FOCUS CONTROL LENS BARREL STRUCTURE

This is a continuation of application Ser. No. 96,731, filed Nov. 23, 1979, and now abandoned.

BACKGROUND OF THE INVENTION

1. Field of the Invention

The present invention relates to a lens barrel for use in cameras such as 35 mm single lens reflex (SLR) cameras, motion picture cameras and TV cameras, and more particularly to a lens barrel capable of being automatically and manually controlled to adjust the focus.

2. Description of Prior Art

In a prior art Japanese Patent Application laid open under No. 50-151144, it is known to engage an attachment, which is driven by an automatic focus control device, with the focus control ring of a lens barrel. In the case of automatic focus control, the attachment is engaged with the focus control ring for rotating it by the automatic focus control device. The attachment is disengaged from the focus control ring for allowing a free rotation thereof for manual focus control. Thus, the focus control can be achieved alternatively by manual control means or automatic control means.

In the above mentioned prior art, however, the automatic focus control device is inevitably provided with considerable power in order to drive the attachment since the focus control ring of a lens barrel usually has an adequate resistance to prevent an undesirable easy rotation thereof. Further, the use of such a prior art focus control device results in an inconvenience for manual focus control operation, as well as bulkiness, and unshapeliness of the camera since the attachment is to be engaged with the lens barrel on the outside thereof at the focus control ring.

In addition, U.S. Pat. No. 3,798,660 discloses a lens mount of an SLR camera that is shifted along the optical axis by the power of the automatic focus control device to shift the whole exchangeable lens barrel attached to the lens mount. In such a system, however, a rigid mechanism is required for the shiftable lens mount to support the weight of the whole lens barrel, as well as sufficiently great power for the automatic focus control device to drive the whole lens barrel.

SUMMARY OF THE INVENTION

The object of the present invention is to provide a novel lens barrel capable of being controlled by both manual and automatic focus control means.

Another object of the present invention is to provide a lens barrel capable of being controlled by a focus control ring as in a conventional lens barrel, and also by an automatic focus control device having relatively small driving power.

Still another object of the present invention is to provide a lens barrel capable of being automatically controlled without interfering with manual focus control.

Yet a further object of the present invention is to provide a lens barrel having a change-over means between manual and automatic focus controls for securing the best functions of both the controls.

According to the present invention, the lens barrel is provided with a first means for manually controlling the focus, e.g., a mechanism connected to the conventional focus ring, and a second means for automatically controlling the focus from the inside of the lens barrel without rotating the conventional focus ring. The first and second focus control means function alternatively.

In the above construction, the lens group participating in a focussing operation can be shifted by the automatic focus control device with the focus ring remaining stationary, and vice-versa. This means that different positions of the lens group may be related to an identical position of the focus ring to cause confusion in the focussing operation when automatic focus control is changed-over to manual focus control, and vice-versa. According to the present invention, however, provision is made to obviate such a drawback.

DETAILED DESCRIPTION OF THE PREFERRED EMBODIMENTS

Figure 1:
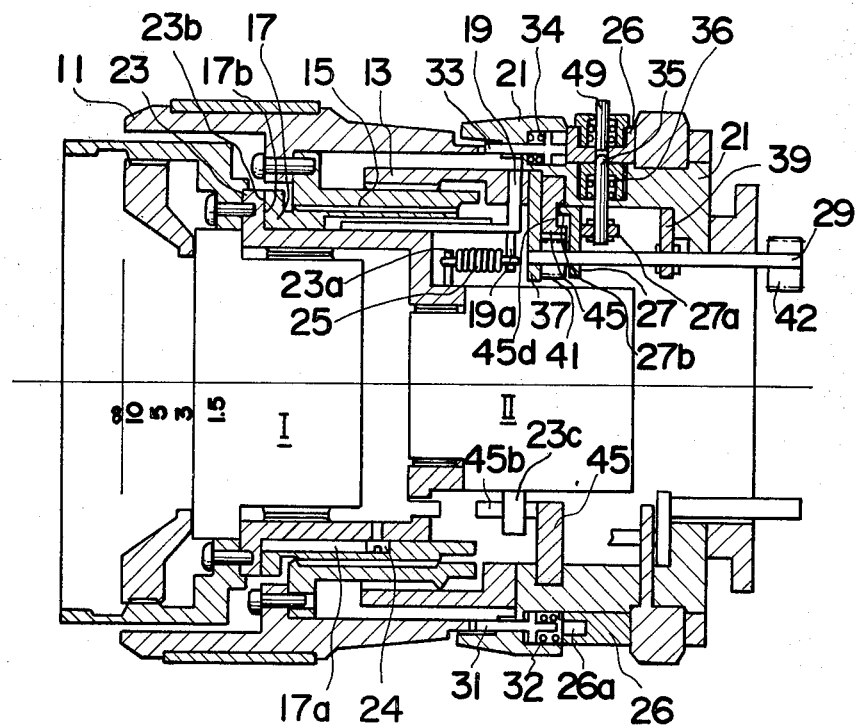
FIG. 1 represents an axial sectional view of a first embodiment of an automatic focus control device of the present invention.
Figure 3:
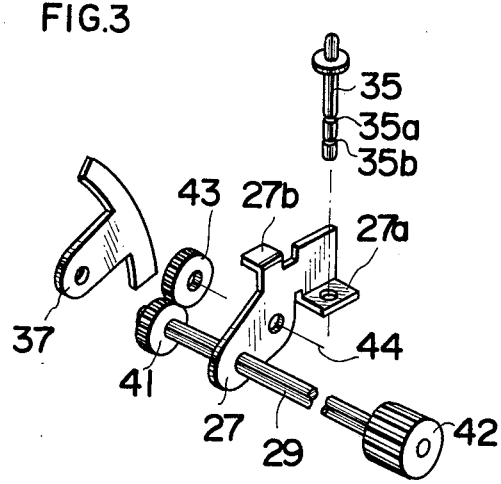
FIG. 3 represents an exploded perspective view of a coupling component for the first embodiment.
Figure 4A:
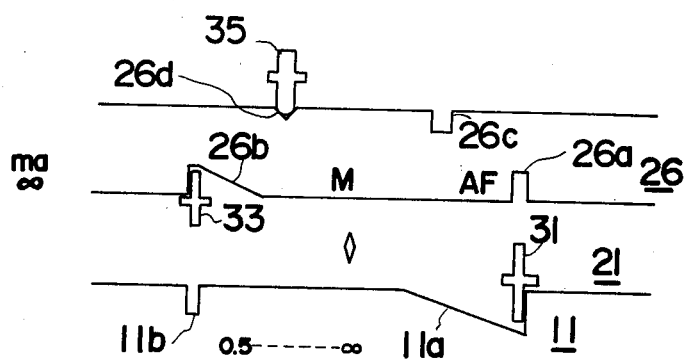
FIGS. 4a, 4b and 5 are schematic illustrations of the relationship between the mutual positions of an automatic/manual changeover member and a focus member, and the position control for such components to explain the function of the first embodiment for various different conditions, respectively.
Figure 4B:
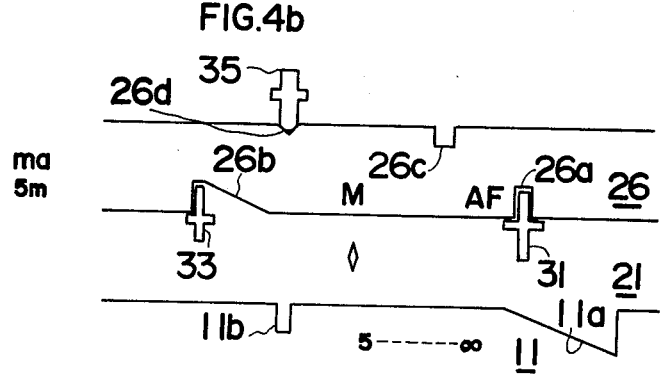
Figure 5:
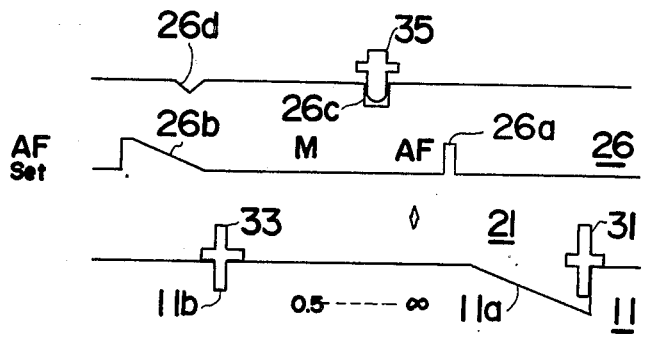

Referring to FIG. 1, distance setting ring 11 is integrally connected with intermediate helicoidal cylinder 15 (one of three helicoidal cylinders constituting a helicoidal mechanism, i.e., outside helicoidal cylinder 13, intermediate helicoidal cylinder 15 and inside helicoidal cylinder 17). Furthermore, the rear end surface of distance setting ring 11 is provided with distance information cam 11a, upon which settable distance detecting member 31 (described infra) abuts; and concave portion 11b into which automatic focus detecting member 33 (also described infra) fits, as illustrated in FIGS. 4a, 4b and 5. Outside helicoidal cylinder 13 is mounted to fixed ring 21, and also mounted to the rear end surface of outside helicoidal cylinder 13 is straightforward key 19 which is mounted to outside helicoidal cylinder 13 and which fits into a straightforward groove of inside helicoidal cylinder 17. Moreover, pin 19a is carried by a surface of helicoidal cylinder 13 toward the optical axis of straightforward key 19. Both front and rear lens groups I and II are retained by lens cylinder 23. Lens cylinder 23 is constructed such that it is sleeved inside helicoidal cylinder 17, pin 23a being carried by the rear end periphery of lens cylinder 23, which is biased toward inside helicoidal cylinder 17 by means of spring 25 provided between pin 23a and pin 19a of straightforward key 19 mounted to outside helicoidal cylinder 13. When manual focus setting is effected, front end surface 17b of inside helicoidal cylinder 17 abuts upon flanged rear end surface 23b of lens cylinder 23. Pin 24 is carried on the outer periphery of lens cylinder 23, and is fitted into straightforward groove 17a of inside helicoidal cylinder 17, whereby the rotation of lens cylinder 23 relative to inside helicoidal cylinder 17 is limited. The rear end of lens cylinder 23 carries pin 23c which abuts on cam portion 45b of semicircular ring 45 (described infra), and when semicircular ring 45 is rotated, pin 23c abutting cam portion 45b is moved along the optical axis in accordance with cam portion 45b, whereby front and rear lens groups I and II are moved along the optical axis with lens cylinder 23. Automatic-manual focus setting changeover ring 26 is provided with concave portion 26a and changeover detecting cam 26b at the front end and slot 26c and click portion 26d on the inner periphery thereof, as shown in FIGS. 4a, 4b and 5. Click groove 26d and slot 26c are actually formed perpendicular to the drawing surface relative to the other components illustrated in FIGS. 4a, 4b and 5; however, for purposes of illustration they are shown in the planar surface of the above Figures. It should be noted that the lines showing slot 26c and click portion 26d in FIGS. 4a, 4b and 5 represent the inner periphery of automatic-manual focus setting changeover ring 26. Settable distance detecting member 31, retained inside fixed cylinder 21, is capable of axial displacement and is biased forward by spring 32 along the optical axis. The front end of settable distance detecting member 31 abuts with distance information cam 11a of distance setting ring 11 and the rear end thereof fits into concave portion 26a of automatic-manual focus setting changeover ring 26 when ring 26 is set to manual focus setting position M, as shown in FIGS. 4a, 4b and 5. When distance setting ring 11 is set at infinity position ∞, as shown in FIG. 4a, settable distance detecting member 31 is moved forward along distance information cam 11a, and the rear end of settable distance detecting member 31 is retracted from concave portion 26a of automatic-manual focus setting changeover ring 26, whereby ring 26 is then enabled to be rotatable. When distance setting ring 11 is set to any position other than the infinity position ∞, as shown in FIG. 4b, settable distance detecting member 31 is fitted by distance information cam 11a into concave portion 26a of automatic-manual focus setting changeover ring 26, whereby the rotation thereof is blocked. Automatic focus detecting member 33 is biased rearward by spring 34, the rear end surface abutting on changeover detection cam 26b of automatic-manual focus setting changeover ring 26. When automatic-manual focus setting changeover ring 26 is set to manual focus setting position M, as in FIGS. 4a and 4b, the rear end of automatic focus detecting member 33 is positioned at the bottom of changeover detection cam 26b and the front end thereof is retracted from concave portion 11b of distance setting ring 11, whereby distance setting ring 11 is rotatable. When automatic-manual focus setting changeover ring 26 is set to automatic focus setting position AF as in FIG. 5, automatic focus detecting member 33 is pushed forward along the optical axis by changeover detection cam 26b to fit into concave portion 11b of distance setting ring 11, and distance setting ring 11 is blocked from being rotated at infinity position ∞. Clutch pin 35 is biased upward by spring 36, with the lower portion of clutch pin 35 having arm 27a of holding plate 27 fitted therein, and the vertical action of clutch pin 35 is limited by means of an E washer fixed in two peripheral grooves 35a and 35b (see FIG. 3). Thus, the vertical movement of clutch pin 35 is linked with the rotating movement of holding plate 27. When automatic-manual focus setting changeover ring 26 is set to manual focus setting position M as shown in FIG. 4a or 4b, clutch pin 35 is blocked from being moved upward by the head portion thereof abutting upon click portion 26d provided on the inner periphery of automatic-manual focus setting changeover ring 26.

Figure 2:
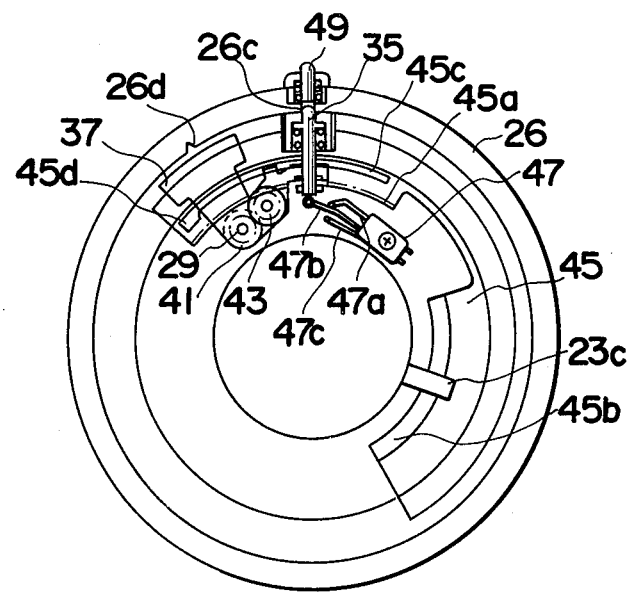
FIG. 2 is a transverse sectional view of a coupling of an output section and a lens position control section of the automatic focus control device of FIG. 1.

When automatic-manual focus setting changeover ring 26 is set to automatic focus setting position AF as shown in FIG. 5, slot 26c of automatic-manual focus setting changeover ring 26 coincides with the head portion of clutch pin 35, and clutch pin 35 is moved upwardly by the action of spring 36, with the head portion of clutch pin 35 fitting into slot 26c of automatic-manual focus setting changeover ring 26 and the flange portion of clutch pin 35 abutting upon automatic-manual focus setting changeover ring 26, which is thereby blocked from being rotated. As shown in FIG. 3, holding plate 27, with arm 27a and tongue 27b, is rotatably pivoted about shaft 29, and maintains idle gear 43 to be rotatable through shaft 44. With continuing reference to FIG. 1, shaft 29 is supported by bearing plates 37 and 39 fixed to fixed cylinder 21, and fixed to the forward section of shaft 29 is gear 41 engageable with idel gear 43. The other end of shaft 49 is fixed to rotating gear 42 which is rotated by a drive system (not shown), such as a motor and driving springs, for example. Semicircular ring 45 is rotatably mounted on the inner periphery of fixed cylinder 21, and, as shown in FIG. 2, formed on semicircular ring 21 is gear section 45a engageable with idle gear 43. Cam portion 45b is provided with a cam which varies gradually in height along the optical axis to move lens groups I and II by abutting and pushing pin 23c of lens cylinder 23 in the automatic focus setting mode. Semicircular ring 45 also has groove portion 45c into which tongue 27b of holding plate 27 fits. Furthermore, formed on a part of groove portion 45c is groove 45d which detects that cam portion 45b of semicircular ring 45 is positioned to set front and rear lens groups I and II at infinity. When clutch pin 35 is inserted into slot 26c of automatic-manual focus setting changeover ring 26 and is moved upwardly, holding plate 27 is lifted so that idle gear 43 engages gear section 45a of semicircular ring 45. When automatic-manual focus setting changeover ring 26 is set to automatic focus setting position AF and clutch pin 35 is lifted, contacts 47a and 47b of changeover switch 47 are closed, cuasing an automatic focus actuating circuit (not shown) to operate to control a drive system (also not shown). However, when clutch pin 35 is lowered, contacts 47c and 47b are closed to operate an automatic focus actuating circuit or a drive system (not shown) and semicircular ring 45 is rotated to insert tongue 27b into groove 45d of semicircular ring 45. Upon depression of automatic focus release button 49 with automatic-manual focus setting changeover ring 26 set to automatic focus setting position AF, changeover switch 47 is effected first by a one step depression of release button 49, causing contacts 47c and 47b to be closed to rotate semicircular ring 45 until a position where groove 45d coincides with tongue 27b of holding plate 27 thereof. This operation permits automatic focus release button 49 to be further depressed, and upon further depression thereof, tongue 27b of holding plate 27 fits into groove 45d of semicircular ring 45 and idle gear 43 is retracted from gear section 45a of semicircular ring 45; clutch pin 35 is retracted from slot 26c of automatic-manual focus setting changeover ring 26, whereby automatic-manual focus setting changeover ring 26 is enabled to rotate.

The following is a description of the operation of the above described embodiment. In the manual focus setting mode, automatic-manual focus setting changeover ring 26 is set to manual focus setting position M, and automatic focus detecting member 33 is retracted from concave portion 11b of distance setting ring 11, whereby distance setting ring 11 is rotatable. When distance setting ring 11 is rotated, lens cylinder 23 is moved straightforward along the optical axis integrally with inside helicoidal cylinder 17, whereby manual focus setting is effected.

In the automatic focus setting mode, distance setting ring 11 is set at infinity position $\infty$ and inside helicoidal cylinder 17 is at its most backward position. Furthermore, when distance setting ring 11 is set at infinity position $\infty$, settable distance detecting member 31 is retracted from concave portion 26a of automatic-manual focus setting changeover ring 26, which is then made rotatable. Additionally, automatic focus detecting member 33 fits into concave portion 11b of distance setting ring 11, which is thereby blocked from being rotated at infinity position $\infty$. When automatic-manual focus setting changeover ring 26 is then rotated and set to automatic focus setting position AF, slot 26c of automatic-manual focus setting changeover ring 26 is positioned above clutch pin 35, which is lifted by the action of spring 36, thereby blocking automatic-manual focus setting changeover ring 26 from being rotated. When clutch pin 35 is lifted, holding plate 27 is also lifted, causing idle gear 43 to engage gear section 45a of semicircular ring 45. At the same time, contacts 47a and 47b of changeover switch 47 are closed, causing an automatic focus actuating circuit (not shown) to be operative. When a starting member (not shown) is actuated, a driving system controlled by an automatic focus actuating circuit (not shown) rotates gear 42 and gear 41, causing idle gear 43 to be rotated, and gear section 45a of semicircular ring 45, engaged with idle gear 43, is moved to rotate semicircular ring 45. When semicircular ring 45 is rotated, cam portion 45b pushes pin 23c of lens cylinder 23 to move straightforwardly front lens group I and rear lens group II retained inside lens cylinder 23. When correct focussing is effected, the automatic focus actuating circuit generates a lens shifting stop signal, whereby the lens shifting is stopped.

A changeover from automatic focus setting mode to manual focus setting mode is effected by depressing automatic focus relase button 49. A first depression of automatic focus release button 49 allows clutch pin 35 to close contacts 47c and 47b, whereby semicircular ring 45 is rotated so that groove 45d is positioned where tongue 27b of holding plate 27 is able to fit therein. This permits automatic focus release button 49 to be further depressed, and upon further depression thereof, clutch pin 35 is lowered, whereby tongue 27b of holding plate 27 is inserted in groove 45d of semicircular ring 45. At the same time, holding plate 27 is rotated, causing idle gear 43 to be retracted from gear section 45a of semicircular ring 45. Under this condition, cam portion 45b of semicircular ring 45 abuts upon pin 23c of lens cylinder 23 at a position where focussing of the lens groups I and II is set at the infinity focussing position $\infty$. Moreover, since clutch pin 35 is retracted from slot 26c of automatic-manual focus setting changeover ring 26, ring 26 is enabled to rotate. When automatic-manual focus setting changeover ring 26 rotates to manual focus setting position M, automatic focus detecting member 33 is retracted from concave portion 11b of distance setting ring 11, thereby causing distance setting ring 11 to be rotatable, and manual focus setting is able to be effected.

Figure 6:
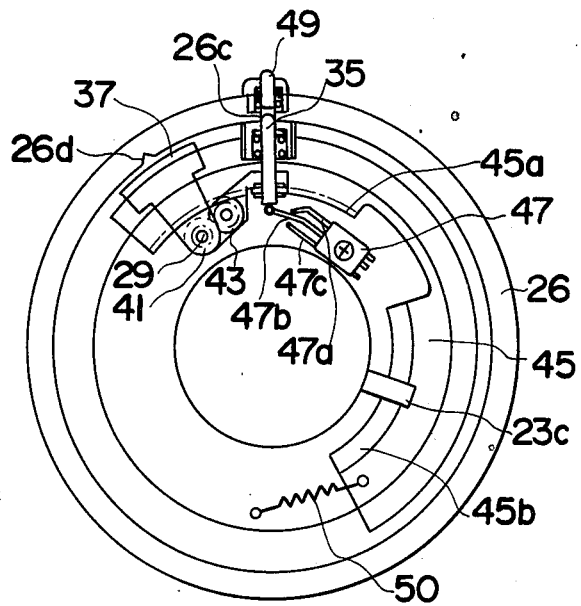
FIG. 6 represents a transverse sectional view of a modification of the first embodiment.
Figure 7:
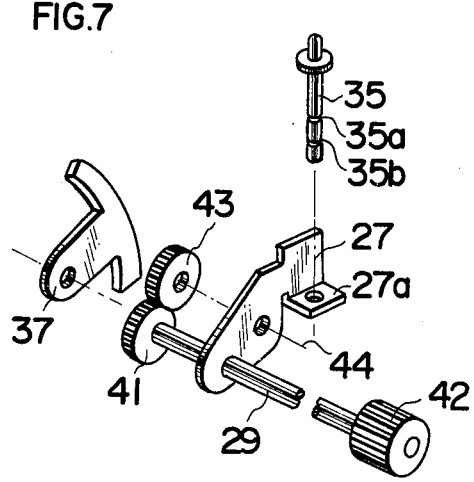
FIG. 7 represents an exploded perspective view of a part of the modification in FIG. 6.

Holding plate 27 and semicircular ring 45 may be shaped as shown in the modified embodiment of FIGS. 6 and 7. Referring to FIG. 6, semicircular ring 45 is biased clockwise by spring 50 so that cam portion 45b may set lens groups I and II at the infinity focussing position $\infty$. Therefore, semicircular ring 45 is not provided with groove portion 45c and groove 45d, and holding plate 27 is not provided with tongue 27b for fitting into groove portion 45c as in the previously described embodiment shown in FIG. 2. Accordingly, when clutch pin 35 is lowered and idle gear 43 is retracted from gear section 45a of semicircular ring 45, semicircular ring 45 is rotated by spring 50 until a position where cam portion 45b sets lens groups I and II at the infinity focussing position $\infty$. In this case, contact 47c for moving a driving system to rotate semicircular ring 45 is not required. Therefore, contact 47c may be used as a contact for transmitting a signal for rotating automatic-manual focus setting changeover ring 26 to manual focus setting position M by means of a motor and the like (not shown) when automatic focus release button 49 is depressed.

However, the present invention is not limited to the above described embodiment. For example, a lens cylinder may be helicoidally fitted into an inside helicoidal cylinder, and a driving shaft and a lens mount may be forward-threaded or linked with a groove cam and a pin, instead of being linked with a cubic cam and a pin. In addition, a lens system to which the present invention is applied may be not only of the wholly shiftable type, but of a partial shiftable type, or of a type wherein a plurality of lens groups are shifted at different speeds. In this case, the lens groups only have to move as required relative to the movement of a lens cylinder. Furthermore, a definite automatic focus control device has not been specified in the present embodiment. Needless to say, however, a variety of prior art devices can be applied in this respect.

Figure 8:
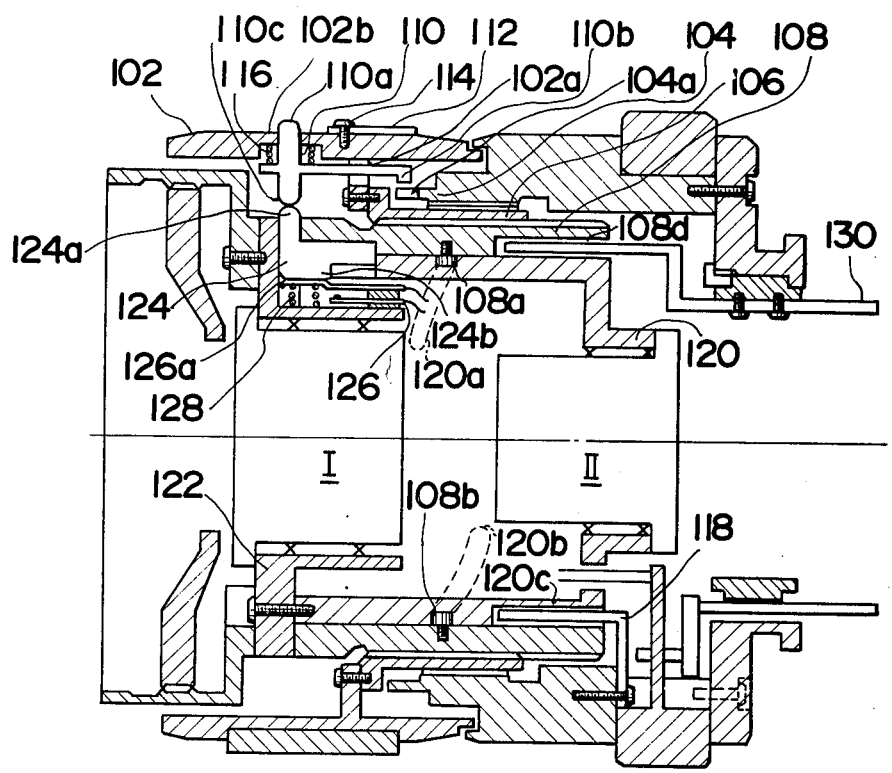
FIG. 8 represents a longitudinal axial sectional view of a second embodiment of an automatic focus control device of the present invention.

With reference to the second embodiment of the automatic focussing control device of FIG. 8, there is mounted to fixed cylinder 104 straightforward key 118 which fits into straightforward groove 120c of second lens group holder 120 (described infra). Additionally, formed at a fixed peripheral position of the front end along the optical axis of fixed cylinder 104 is concave portion 104a, into which focus ring locking claw 110b of automatic-manual focus control changeover button 110 (described infra) fits. In this embodiment, the position of concave portion 104a is set so that focus ring locking claw 110b may fit into concave portion 104a of fixed cylinder 104 when focus ring 102 (described infra) is set to an infinity focussing position. First movable cylinder 106 is coupled by a helicoidal mechanism to fixed cylinder 104.

Focus ring 102, for manual focus control, is coupled integrally with first movable cylinder 106. Also provided on focus ring 102 are changeover button support 102a which permits automatic-manual focus control changeover button 110 (described infra) to be perpendicularly movable with respect to the optical axis, and hole 102b through which head portion 110a of automatic-manual focus control changeover button 110 passes. Furthermore, rotatably supported by pin 114 on the outer periphery of focus ring 102 is changeover button cover 112 which retains automatic-manual focus control changeover button 110 in a depressed condition.

Automatic manual focus control changeover button 110 is supported such that it is movable perpendicularly to the optical axis by means of changeover button support 102a of focus ring 102, with head portion 110a passing through hole 102b to be projectable from the outer periphery of focus ring 102. Moreover, there is provided at the rear end of automatic-manual focus control changeover button 110 focus ring locking claw 110b which fits into concave portion 104a of fixed cylinder 104. When focus ring locking claw 110b fits into concave portion 104a of fixed cylinder 104, focus ring 102 is locked in position. Additionally, automatic-manual focus control changeover button 110 is biased by spring 116 toward the optical axis, lower end portion 110c being constructed to press down head portion 124a of locking member 124 (described infra).

Figure 11A:
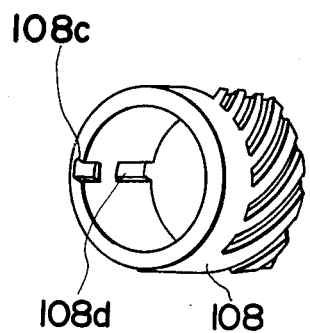
FIGS. 11a and 11b represent respective perspective views of parts of the second embodiment.

Second movable cylinder 108 is connected to first movable cylinder 106 by a helicoidal mechanism. The inner periphery of second movable cylinder 108 carries a pair of pins 108a and 108b which fit into a pair of cam grooves 120a and 120b, respectively, provided on second lens group holder 120 (described infra), as shown in FIG. 8. Furthermore, as shown in FIG. 11a, there is provided on the front inner periphery of second movable cylinder 108 groove 108c engageable with the rear end of locking member 124 (described infra), and on the rear inner periphery of second movable cylinder 108 groove 108d engageable with driving lever 130 (described infra) is provided.

First lens group holder 122 retains first lens group I movable along the optical axis for focus control, and second lens group holder 120 retains second lens group II movable along the optical axis for focus control. First lens group holder 122 and second lens group holder 120 are coupled integrally to each other. Mounted on the rear outer periphery surface of first lens group holder 122 is auto-focus power supply switch 126 for supplying power to an automatic focus control device (not shown) when closed. Switch 126 is opened or closed by the vertical movement of locking member 124 (as described infra). Upper contact 126a of auto-focus power supply switch 126 is biased by spring 128 so that it may lift locking member 124 upwardly. It should be noted that the force of spring 128 is set at a stronger level than that of spring 116, this causing automatic-manual focus control changeover button 110 to be lifted when locking member 124 is lifted by spring 128, whereby head portion 110a projects from the outer periphery of focus ring 102. Furthermore, as shown in FIG. 11b, there is provided on first lens group holder 122 locking member housing groove 122a which movably houses the front of locking member 124 in the vertical direction of FIG. 11b.

Figure 11B:
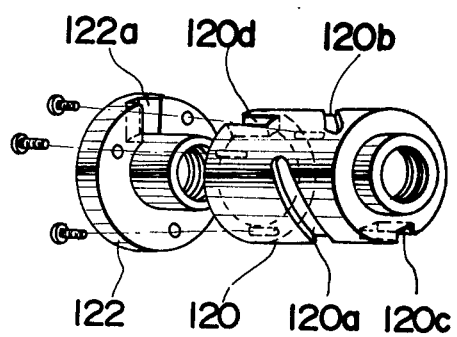

Moreover, second lens group holder 120 forms a sleeve for second movable cylinder 108, and as is clear from FIG. 11b, formed at a symmetrical position relative to the optical axis on the outer peripheral surface of second lens group holder 120 is a pair of grooves 120a and 120b engageable respectively with a pair of pins 108a and 108b carried by second movable cylinder 108, and also formed at the rear end of second lens group retainer is straightforward groove 120c into which straightforward key 118 fits (Ref. FIG. 8). Furthermore, there is also provided on the front of second lens group holder 120 locking member housing groove 120d which houses the rear of locking member 124 (as described infra).

With further reference to FIG. 8, locking member 124 limits the rotation of second movable cylinder 108 relative to second lens group holder 120 when required. Head portion 124a of locking member 124 is abuttable with lower end portion 110c of automatic-manual focus control changeover button 110. The bottom of locking member 124 is in contact with contact piece 126a of auto-focus power supply switch 126.

Figure 9:
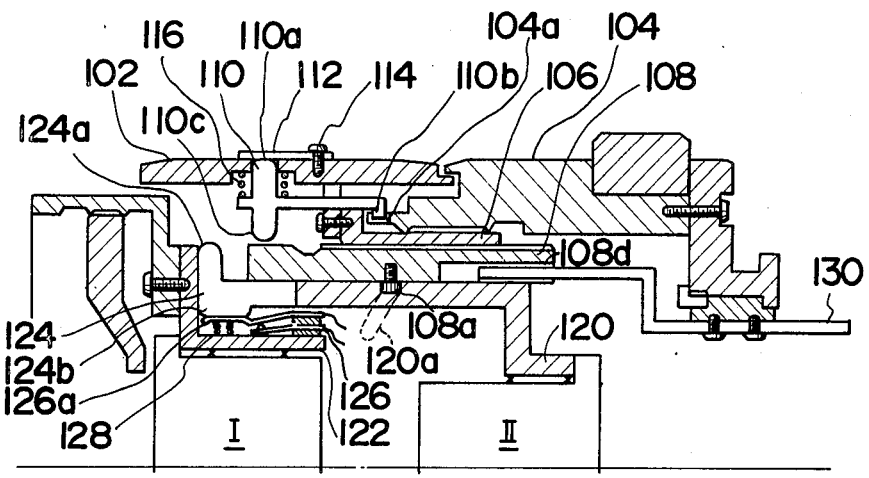
FIGS. 9 and 10 represent respective partial axial sectional views of the second embodiment for automatic focus control and manual focus control modes, respectively.
Figure 10:
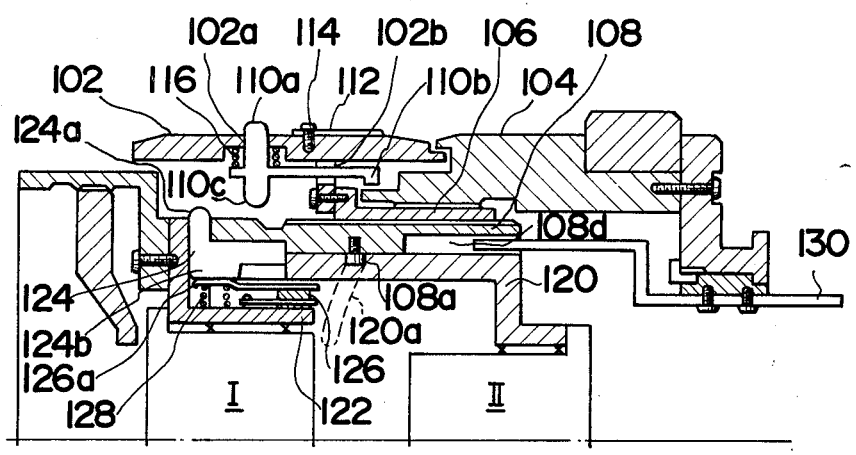

With the above construction, when locking member 124 is lifted by spring 128 as shown in FIG. 8 or 10, the rear of locking member 124 is fitted into both groove 108c of second movable cylinder 108 shown in FIG. 11a and locking member housing groove 120d of second lens group holder 120 shown in FIG. 11b, causing second movable cylinder 108 and second lens group holder 120 to be connected integrally with each other. With the above conditions, second lens group holder 120 is limited to a rotating movement around the optical axis by straightforward key 118, and thereby causing second movable cylinder 108 also to be limited to its rotating movement around the optical axis. When head portion 110a of automatic-manual focus control changeover button 110 is pressed from the condition shown in FIG. 8, lower end portion 110c of automatic-manual focus control changeover button 110 presses head portion 124a of locking member 124, whereby locking member 124 is lowered and positioned as shown in FIG. 9. This causes the rear of locking member 124 to be retracted from groove 108c of second movable cylinder 108 (FIG. 11a), whereby the integral connection between second movable cylinder 108 and second lens group holder 120 is released, and second movable cylinder 108 is enabled to rotate. At the same time, locking member 124 is lowered to close auto-focus power supply switch 126, thereby supplying power to an automatic focus control device (not shown). It should be understood that an operating switch for an automatic focus control device is provided at an appropriate location on the camera body or lens barrel (not shown).

Auto-focus driving lever 130 is rotatable around the optical axis under control of an automatic focus control device (not shown) that is well known to those skilled in the art, and the front end of auto-focus driving lever 130 is moved into groove 108d of second movable cylinder 108. When auto-focus driving lever 130 is rotated around the optical axis under control of the aforementioned known automatic focus control device (not shown), second movable cylinder 108 is rotated by auto-focus driving lever 130. It is noted that the length of groove 108d of second movable cylinder 108 and the length of the front end of auto-focus driving lever 130 are preset so that the front end of auto-focus driving lever 130 is always within groove 108d of second movable cylinder 108.

The operation of the above described second embodiment is as follows. As shown in FIG. 8 or 10, automatic-manual focus control changeover button 110 is placed in a lifted position in the manual focus control mode, so that head portion 110a projects from the outer periphery of focus ring 102. Since automatic-manual focus control changeover button 110 is in the lifted position, focus ring locking claw 110b of changeover button 110 is retracted from concave portion 104a of fixed cylinder 104, whereby focus ring 102 is rotatable. Furthermore, since automatic-manual focus control changeover button 110 is in the lifted position, locking member 124 is also placed in a lifted position without being pressed by automatic-manual focus control changeover button 110. Also, the rear of locking member 124 is fitted within both groove 108c of second movable cylinder 108 (shown in FIG. 11a) and locking member housing groove 120d of second lens group holder 120 (shown in FIG. 11b), whereby the rotation of second movable cylinder 108 is limited, and second movable cylinder 108 and second lens group holder 120 are integrally connected to each other.

When focus ring 102 is rotated under the above conditions, first movable cylinder 106, connected integrally with focus ring 102, is rotated, and first movable cylinder 106 is moved along the optical axis relative to fixed cylinder 104, to which first movable cylinder 106 is helicoidally connected. Second movable cylinder 108, connected helicoidally to first movable cylinder 106, is moved along the optical axis relative to first movable cylinder 106 by the rotation thereof. However, second movable cylinder 108 has limited rotation, and therefore, is moved straightforward along the optical axis. With such movement, second lens group holder 120 integrally connected to second movable cylinder 108 by locking member 124, first lens group holder 122 integrally connected to second lens group holder 120, and second lens group II and first lens group I held thereby, respectively, are integrally moved along the optical axis, whereby manual focus control is effected.

When changing from the manual focus control mode to the automatic focus control mode, focus ring 102 is set first to an infinity focussing position. This causes, as shown in FIG. 8, focus ring locking claw 110b of automatic-manual focus control changeover button 110 to be positioned within concave portion 104a of fixed cylinder 104, and at the same time, lower end portion 110c of automatic-manual focus control changeover button 110 to be positioned to press head portion 124a of locking member 124. When automatic-manual focus control changeover button 110 is pressed and changeover button cover 112 is rotated so that automatic-manual focus control changeover button 110 remains lowered, focus ring locking claw 110b of automatic-manual focus control changeover button 110 is fitted into concave portion 104a of fixed cylinder 104, as shown in FIG. 9, whereby focus ring 102 and first movable cylinder 106, connected integrally therewith, are fixed to non-movable cylinder 104. At the same time, automatic-manual focus control changeover button 110 is lowered, causing locking member 124 to be pressed downwardly, the rear of locking member 124 then being retracted from groove 108c of second movable cylinder 108, and housed in locking member housing groove 120d of second lens group holder 120, whereby second movable cylinder 108 is rotatable. Furthermore, locking member 124 is lowered to close auto-focus power supply switch 126, thereby supplying power to an automatic focus control device (not shown). When the operating switch (not shown) of an automatic focus control device (not shown) is closed, auto-focus driving lever 130 is rotated around the optical axis under control of an automatic focus control device, whereby second movable cylinder 108 is rotated. Second movable cylinder 108 is connected helicoidally with first movable cylinder 106, and first movable cylinder 106 is connected to non-movable cylinder 104, causing second movable cylinder 108 to move along the optical axis when rotated. Additionally, when second movable cylinder 108 is rotated, a pair of pins 108a and 108b carried by second movable cylinder 108 press into a pair of cam grooves 120a and 120b provided on second lens group holder 120, respectively, and the rotation of second lens group holder 120 is limited by straightforward key 118, thereby second lens group holder 120 is moved straightforwardly along the optical axis. When second lens group holder 120 is moved straightforwardly along the optical axis, first lens group holder 122, integrally connected with second lens group holder 120, second lens group II and first lens group I held respectively thereby are integrally moved along the optical axis, whereby automatic focus control is effected.

FIGS. 12, 13 and 14a and 14b show another embodiment of a changeover means for changing from automatic focus control mode to manual focus control mode.

Figure 12:
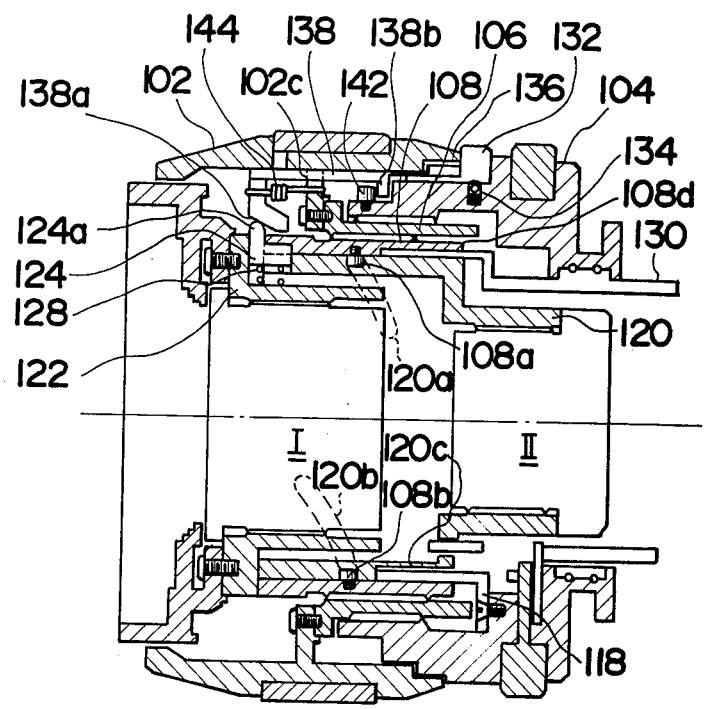
FIG. 12 represents an axial sectional view of a third embodiment of the present invention.
Figure 13:
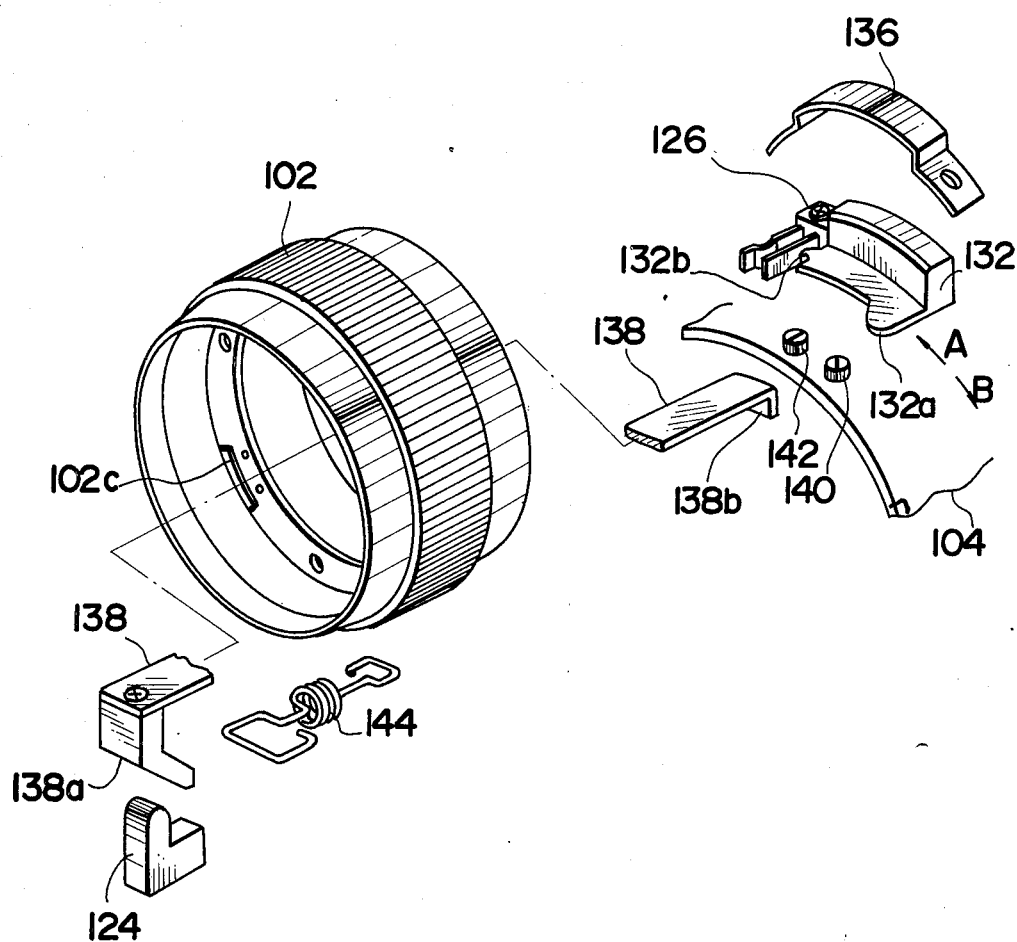
FIG. 13 represents an exploded perspective partial view of the third embodiment.
Figure 14A:
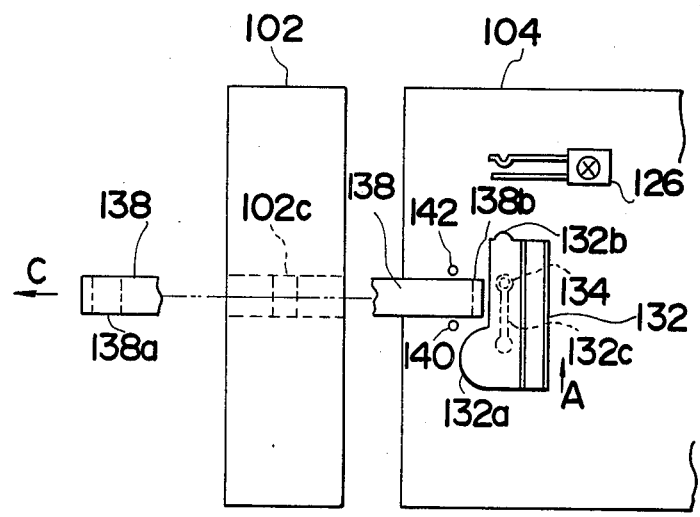
FIGS. 14a and 14b represent respective schematic plan views for explaining the function of the third embodiment.
Figure 14B:
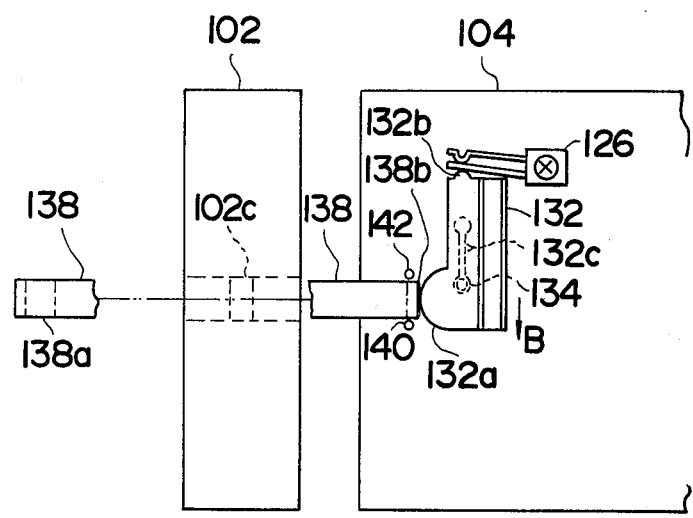

The following description is taken with reference to FIGS. 12, 13, 14a and 14b wherein the same reference numerals are used for structure corresponding to that of FIGS. 8 through 11, and description of such corresponding structure is omitted. Automatic-manual focus control changeover member 132 is guided by guide means 136 so that it may be movable along the outer periphery surface of non-movable cylinder 104 in the direction of arrow A or B of FIGS. 13, 14a and 14b. Furthermore, as is clear from FIGS. 13, 14a and 14b, there is formed at the front portion of one end of automatic-manual focus control changeover member 132 cam 132a, the height of which along the optical axis is different for pressing bent portion 138b at the rear end of transmitting member 138 (described infra). At a side of the other end of changeover member 132 is formed projection 132b which closes auto-focus power supply switch 126 mounted to fixed cylinder 104. Additionally, as shown in FIGS. 14a and 14b, formed on the abutting surface of automatic-manual focus control changeover member 132 on fixed cylinder 104 is a slot 132c, both ends of which have a pair of oppositely disposed concave portions engageable with click pin 134 provided on fixed cylinder 104 and biased by a spring so that click pin 134 may project from the outer periphery of fixed cylinder 104. With the above construction, automatic-manual focus control changeover member 132 can be fixed under the conditions of FIG. 14a or FIG. 14b when click pin 134 fits in the concave portions on both sides of slot 132c.

Transmitting member 138 presses locking member 124 by the operation of automatic-manual focus control changeover member 132. Transmitting member 138 is supported movably along the optical axis relative to focus ring 102 by support 102c of focus ring 102 so that it may be rotated integrally therewith, transmitting member 138 being biased rearward (rightwards in FIG. 12) by spring 144. Furthermore, on the rear end of transmitting member 138, there is provided bent projection 138b which is pressed by cam 132a of automatic-manual focus control changeover member 132, and on the front lower end of transmitting member 138 there is formed slant surface 138a by which locking member 124 is pressed to be lowered when transmitting member 138 is moved forward by cam 132a of automatic-manual focus control changeover member 132. It is to be noted that in the above embodiment transmitting member 138 is moved by automatic-manual focus control changeover member 132 to a pressing position when focus ring 102 is set to an infinity focussing position. Furthermore, the position of cam 132a of automatic-manual focus control changeover member 132 is set to a position where the rotation of the rear end of transmitting member 138, rotating integrally with focus ring 102, is not prevented in the manual focus control mode.

As shown in FIGS. 13, 14a and 14b, the outer periphery at the front of non-movable cylinder 104 carries a pair of pins 140 and 142 for blocking the rotation of bent projection 138b into a position where it is located when transmitting member 138 is advanced by automatic-manual focus control changeover member 132. It should be understood that in the above embodiment, transmitting member 138 is arranged to be located at a position as shown in FIG. 14a or 14b when focus ring 102 is set to an infinity focussing position. Therefore, if focus ring 102 is provided with a means for stopping any rotation beyond the infinity focussing position, no means for blocking transmitting member 138 in the direction (pin 140 in the above embodiment) may be required. Conversely, by blocking the rotation of transmitting member 138 focus ring 102 may be blocked from being rotated beyond the infinity focussing position.

It is to be noted that in the above embodiment autofocus power supply switch 126 is located on the outer periphery of non-movable cylinder 104, thereby requiring no auto-focus power supply switch 126 to be provided on first lens group holder 122 as in FIGS. 8 through 11.

The operation of the above described embodiment of FIGS. 12 to 14a and 14b is as follows. Manual focus control conditions are shown in FIGS. 12 and 14a. With such conditions, cam 132a of automatic-manual focus control changeover member 132 does not press bent projection 138a of transmitting member 138, which is moved backward by spring 144. Therefore, bent projection 138b of transmitting member 138 remains unblocked for rotation by pin 142, causing focus ring 102 to be movable. Furthermore, since transmitting member 138 is moved backwardly, slant surface 138a of transmitting member 138, does not press locking member 124. Therefore, locking member 124 is in the lifting position, and second lens group holder 120 and second movable cylinder 108 are connected integrally with each other by locking member 124. When focus ring 102 is rotated under such conditions, manual focus control is effected in exactly the same manner as that described in the embodiment of FIGS. 8 through 11.

When changing from manual focus control mode to automatic focus control mode, focus ring 102 is set first to the infinity focussing position. This causes, as shown in FIG. 14a, transmitting member 138 to be positioned such that automatic-manual focus control changeover member 132 is able to pressingly engage it. At the same time, transmitting member 138 is also positioned to press locking member 124, as shown in FIG. 12. Therefore, as shown in FIG. 14a, when automatic-manual focus control changeover member 132 is moved in the direction indicated by arrow A, bent projection 138b of transmitting member 138 is pressed by cam surface 132a of automatic-manual focus control changeover member 132 to be moved in the direction of arrow C, and autofocus power supply switch 126 is then closed by projection 132b of automatic-manual focus control changeover member 132, thereby supplying power to an automatic focus control device (not shown), whereby the condition of FIG. 14b is effected. In this condition, bent projection 138b of transmitting member 138 is blocked by pin 140 or 142 from being rotated, whereby focus ring 102 is also blocked from being rotated. Additionally, as shown in FIG. 12, transmitting member 138 is advanced, causing slant surface 138a of transmitting member 138 to press locking member 124, which is thereby lowered. Therefore, the integral connection between second lens group holder 120 and second movable cylinder 108 is released, whereby second movable cylinder 108 becomes rotatable. With such conditions, the operating switch of an automatic focus control device (not shown) is closed, causing automatic focus control to be effected in exactly the same way as that described in the embodiment of FIGS. 8 through 11.

When changing from manual focus control mode to automatic focus control mode, the changeover operation according to the above embodiment is effected only by moving automatic-manual focus control changeover member 132, instead of pressing automatic-manual focus control changeover button 110, and rotating changeover button cover 112 to maintain the changeover button 110 in its pressed condition, as in the embodiment of FIGS. 8 through 11. Changeover operation can be simplified by the embodiment of FIGS. 12 to 14a and 14b.

Figure 15:
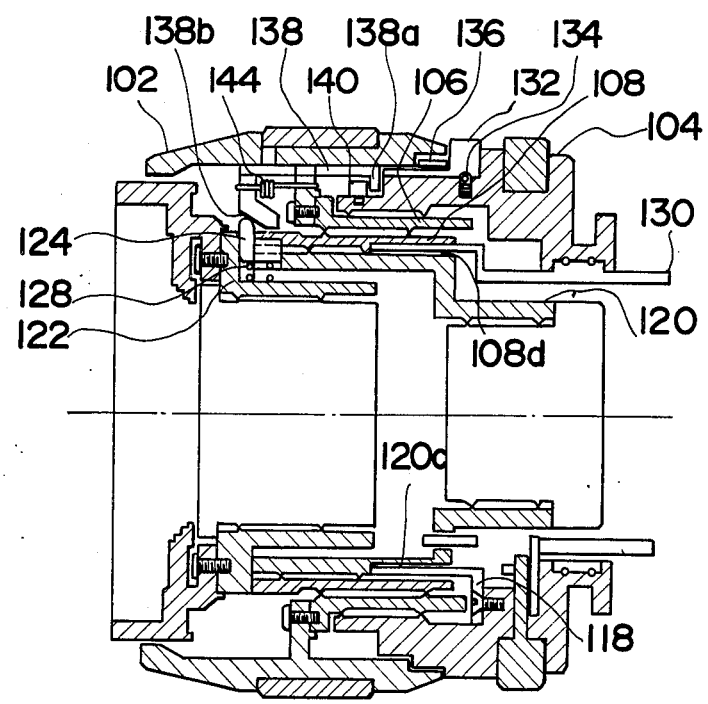
FIG. 15 represents an axial sectional view of a fourth embodiment of the present invention.

FIG. 15 shows a modification of the embodiment of FIGS. 12 through 14a and 14b. The embodiment of FIG. 15 is different from that of FIGS. 12 through 14a and 14b in that second movable cylinder 108 and second lens group holder 120 in the last-mentioned embodiment are connected by means of a sleeve with two pins and cam grooves, whereas such connection in FIG. 15 is modified to be a helicoidal connection. Therefore, in the embodiment of FIG. 15, manual focus control is effected in a similar manner to the embodiment of FIGS. 12 through 14a and 14b. Moreover, when second movable cylinder 108 is rotated for automatic focus control, it is moved along the optical axis relative to first movable cylinder 106, and second lens group holder 120 is moved along the optical axis relative to second movable cylinder 108 by a helicoidal mechanism.

With the above construction, both manual focus control and automatic focus control are accurately possible by use of a helicoidal mechanism.

It should be noted that all of the above three embodiments are of the construction in which automatic focus control and manual focus control are changeable when the focus ring is set to an infinity focussing position, but the present invention is not limited to the foregoing. A changeover may be made possible when the focus ring is set to a closest focussing position or a changeover may be made possible at any position unless manual focus control is prevented by a changeover member or other similar structure.

Additionally, the connections between a non-movable cylinder and a first movable cylinder and between a first movable cylinder and a second movable cylinder are not limited only to the above embodiment. For example, a sleeve-fitting with pins and grooves may be used as the connection between second movable cylinder 108 and second lens group holder 120 of the embodiment of FIGS. 8 through 11. Additionally, if the movement of a first movable cylinder along the optical axis relative to non-movable cylinder is not needed, the first movable cylinder may only have to transmit the rotation of a focus ring to the second movable cylinder, and therefore, the fixed cylinder and the first movable cylinder are sleeve-fitted with each other so that the first movable cylinder may not be moved unnecessarily along the optical axis.

Furthermore, to limit the rotation of a second movably cylinder relative to a non-movable cylinder in the manual focus control mode, a well-known straightforward key and straightforward groove means may be provided between the second movable cylinder and the non-movable cylinder. Alternatively, auto-focus driving lever 130 in the above embodiment may be fixed for use as a straightforward key instead of connecting the second movable cylinder and the second lens group holder integrally with each other as in the above embodiment.

What is claimed is:

1. A lens barrel for automatic and manual focus control of a camera, comprising:
    a non-movable barrel adapted to be mounted on the camera;
    a first movable barrel movably carried by said non-movable barrel;
    a second movable barrel movably carried by said first movable barrel;
    a third movable barrel movably carried by said second movable barrel for carrying at least one lens group for focussing by means of axial movement thereof;
    means for guiding said third movable barrel for movement without any rotation relative to said non-movable barrel;
    first means for shifting said second movable barrel along the optical axis of said at least one lens group relative to said non-movable barrel; and
    second means for shifting said third movable barrel along said optical axis relative to said non-movable barrel, one of said first and second shifting means being for automatic focus control operation and the other for manual focus control operation.

2. A lens barrel according to claim 1, wherein said guiding means includes first means for restraining the relative rotation between said non-movable barrel and said second movable barrel, and second means for restraining the relative rotation between said second and third movable barrels, said first shifting means includes means for making a pair of connections between said non-movable barrel and first movable barrel and between said first and second movable barrels to shift said second movable barrel in response to the rotation of said first movable barrel relative to said non-movable barrel and said second movable barrel, and said second shifting means includes means for sliding said third movable barrel relative to said second movable barrel.

3. A lens barrel according to claim 2, wherein said sliding means includes means for biasing said third movable barrel in one direction of movement thereof and means for moving said third movable barrel in opposition to said biasing means.

4. A lens barrel according to claim 1, wherein said guiding means includes means for restraining the relative rotation between said non-movable barrel and said third movable barrel, said first shifting means includes first means for restricting the relative rotation of said second movable barrel to said non-movable barrel, and first connecting means for making a pair of connections between said non-movable barrel and said first movable barrel and between said first and second movable barrels to shift said second movable barrel in response to the rotation of said first movable barrel relative to said non-movable barrel with the relative rotation of said second movable barrel to said non-movable barrel restricted, and said second shifting means includes second means for restricting the relative rotation of said first movable barrel to said non-movable barrel and second connecting means for making a pair of connections between said first and second movable barrels and between said second and third movable barrels to shift said third movable barrel in response to the rotation of said second movable barrel relative to said third movable barrel with the relative rotation of said first movable barrel to said non-movable barrel restricted.

5. A lens barrel according to claim 4, wherein said first restraining means includes means for selectively connecting said second movable barrel to said third movable barrel, and said second restraining means includes means for selectively connecting said first movable barrel to said non-movable barrel.

6. A lens barrel for automatic and manual focus control of a camera, comprising:
    a non-movable barrel for holding the whole lens barrel;
    a movable barrel for carrying at least one lens group for focussing by means of its axial movement;
    first means for shifting said movable barrel along the optical axis of said at least one lens group relative to said non-movable barrel in accordance with manual focus control operation; and
    second means for shifting said movable barrel along said optical axis relative to said non-movable barrel in accordance with automatic focus control operation, said second shifting means being independently operable from said first shifting means to shift said movable barrel without movement of said first shifting means.

7. Focussing device for automatic and manual focus control of a camera, comprising;
    means for carrying at least one lens group for focussing by means of axial movement thereof;
    first means for shifting said carrying means along the optical axis of said at least one lens group in accordance with manual force control operation;
    second means for shifting said carrying means along said optical axis in accordance with automatic focus control operation, said second shifting means being independently operable from said first shifting means to shift said carrying means;
    means for selecting one of said first and second shifting means to shift said carrying means;
    first means for setting said first shifting means in a specific condition to locate said carrying means at a predetermined position with said second shifting means selected by said selecting means; and
    second means for setting said second shifting means in a specific condition to locate said carrying means at a predetermined position with said first shifting means selected by said selecting means.

8. Focussing device according to claim 7, further comprising means controlled by said selecting means to transmit an automatic focus control signal.

9. Focussing device according to claim 7, wherein said first shifting means includes a focus ring and said first setting means includes means for locking said focus ring to be non-rotatable.

10. Focussing device according to claim 7, further comprising means for preventing said selecting means from selecting said second shifting means with said first shifting means not in said specific condition.

11. Focussing device according to claim 7, wherein said second setting means includes means for driving said carrying means to said predetermined position with said first shifting means selected by said selecting means.

12. Focussing device according to claim 11, further comprising means for preventing said selecting means from completing the selection of said first shifting means until said carrying means reaches said predetermined position driven by said driving means.

13. Focussing device for automatic and manual focus controls comprising;
    means for carrying at least one lens group for focussing by means of axial movement thereof;
    first means for shifting said carrying means along the optical axis of said at least one lens group in accordance with manual focus control operation;
    second means for shifting said carrying means along said optical axis in accordance with automatic focus control operation, said second shifting means being independently operable from said first shifting means to shift said carrying means;
    means for selecting one of said first and second shifting means to shift said carrying means; and
    means for allowing the change in selection by said selecting means only at a predetermined position of said carrying means.

* * * * *